United States Patent [19]

Matsui

[11] Patent Number: 5,096,467
[45] Date of Patent: Mar. 17, 1992

[54] ARTIFICIAL TORNADO GENERATING MECHANISM AND METHOD OF UTILIZING GENERATED ARTIFICIAL TORNADOS

[75] Inventor: Shigeo Matsui, Tokyo, Japan

[73] Assignee: Japan Air Curtain Company, Ltd., Tokyo, Japan

[21] Appl. No.: 282,882

[22] Filed: Dec. 9, 1988

Related U.S. Application Data

[63] Continuation of Ser. No. 904,903, Sep. 8, 1986, abandoned.

[30] Foreign Application Priority Data

May 9, 1986 [JP] Japan .................. 61-106384

[51] Int. Cl.⁵ .................. B04C 3/06; B01D 45/04
[52] U.S. Cl. .................. 55/1; 55/83; 55/261; 55/473
[58] Field of Search .................. 55/83, 261, 468, 473, 55/456-459.1; 366/107; 406/92, 137, 153, 171; 137/810-812

[56] References Cited

U.S. PATENT DOCUMENTS

| | | | |
|---|---|---|---|
| 677,358 | 7/1901 | Hyde | 55/458 |
| 857,096 | 6/1907 | McCord | 406/92 |
| 1,416,040 | 5/1922 | Levedahl | 55/458 X |
| 2,085,842 | 7/1937 | Wentworth | 406/92 X |
| 2,509,817 | 5/1950 | Foreman | 55/457 X |
| 3,047,208 | 7/1962 | Coanda | 55/468 X |
| 3,063,223 | 11/1962 | Arbisi | 55/468 |
| 3,199,268 | 8/1965 | Oehlrich et al. | 55/261 |
| 3,199,269 | 8/1965 | Oehlrich et al. | 55/261 |
| 3,199,270 | 8/1965 | Oehlrich | 55/261 |
| 3,199,271 | 8/1965 | Schmidt et al. | 55/261 |
| 3,199,272 | 8/1965 | Oehlrich et al. | 55/261 |
| 3,226,165 | 12/1965 | Oehlrich et al. | 55/261 X |
| 3,312,507 | 4/1967 | Oehlrich et al. | 55/261 X |
| 3,358,844 | 12/1967 | Klein et al. | 55/261 X |
| 3,396,511 | 8/1968 | Fracke et al. | 55/83 |
| 3,477,569 | 11/1969 | Klein et al. | 55/261 X |
| 3,600,817 | 8/1971 | Klein | 55/261 X |
| 3,616,619 | 11/1971 | Klein | 55/457 X |
| 3,641,743 | 2/1972 | Hoffmann et al. | 55/261 X |
| 3,677,650 | 7/1972 | Klingler | 55/456 X |
| 3,720,314 | 3/1973 | Phillippi | 55/261 X |
| 3,739,627 | 6/1973 | Klingler | 55/458 X |
| 3,744,220 | 7/1973 | Klein | 55/261 |
| 3,768,172 | 10/1973 | Klein et al. | 55/261 X |
| 3,769,781 | 11/1973 | Klein et al. | 55/261 |
| 3,771,291 | 11/1973 | Klingler | 55/261 |
| 3,791,110 | 2/1974 | Klein et al. | 55/261 |
| 3,917,568 | 11/1975 | Klein et al. | 55/261 X |
| 3,972,697 | 8/1976 | Short, Jr. | 55/261 X |
| 4,027,407 | 6/1977 | Kiss | 406/153 X |
| 4,685,943 | 8/1987 | Priestley, Jr. | 55/261 X |

FOREIGN PATENT DOCUMENTS

| | | | |
|---|---|---|---|
| 640354 | 5/1962 | Italy | 55/261 |
| 640933 | 1/1979 | U.S.S.R. | 406/92 |
| 933224 | 8/1963 | United Kingdom | 55/261 |
| 933225 | 8/1963 | United Kingdom | 55/261 |

*Primary Examiner*—Robert Spitzer
*Attorney, Agent, or Firm*—Bauer & Schaffer

[57] ABSTRACT

An array of parallel pipes, each having ports through which jet-like air streams exit, are arranged so that a peripherally directed air curtain is formed. The posts are shielded at both ends, and one end is provided with a chimney along a central axis of the air by which air or fluid is removed. By giving the air curtain a centrifugal force, a negative pressure is produced along a central core, and a spiral flow is produced, creating an artificial tornado.

16 Claims, 7 Drawing Sheets

5,096,467

ARTIFICIAL TORNADO GENERATING MECHANISM AND METHOD OF UTILIZING GENERATED ARTIFICIAL TORNADOS

This is a continuation of Ser. No. 904,903, filed Sept. 8, 1986, now abandoned.

FIELD OF THE INVENTION

This invention relates to an apparatus for generating artificial tornados and methods of utilizing artificial tornados generated by the same apparatus.

BACKGROUND OF THE INVENTION

In the generally used conventional method of discharging detrimental gases and dusts, an exhaust hood is provided near the source to suck the gas away. Therefore, there is no directivity at all in the suction so that if separated from the suction apparatus the wind velocity will attenuate so quickly that it is difficult to obtain the required controlled wind velocity. Such large volumes of not only the generated detrimental gases and dusts, but also of ambient air is sucked in so that as a result a large blower and duct are required increasing the many problems inherently found in the equipment and cost attendant thereto.

There has recently been developed a method wherein an artificial tornado is generated in order to exhaust detrimental gases and dusts. For example, a spiral flow is made in the center of a horizontally elongated exhaust hood so as to suck air from the hood. This current can generate, in the enclosed exhaust hood, a sucked wind velocity along its horizontal length, but it has no sucking action in the free space. In this sense, this method is not different from the conventional side hood exhaust system. There is also a device wherein air is blown out in the form of a tornado created by burning the air with a burner or rotating a blowing nozzle. However, these blowing tornado mechanisms, are not in fact tornados in form, and are quite different particularly in their ultimate use.

SUMMARY OF THE INVENTION

An object of the present invention is to provide a mechanism whereby an artificial tornado, so far considered to be impossible, can be generated simply and easily and to provide methods for utilizing the artificial tornados generated by the mechanism.

According to the present invention a mechanism is provided wherein several air blowing pipes are arranged between shielding end plates, one of which is provided with a suction exhaust port or chimney so that a circulating system (rotating air stream) may be formed consisting of peripheral air curtains, within which a central vacuum core created by the air sucked from the center generates an artificial tornado.

The principle of the present invention lies in the fact that when a centrifugal force is imparted to a circulating stream (rotating air stream) in the form of an air curtain, a negative pressure is produced in the central area, and by withdrawing air from the central exhaust port, an elongated vacuum core, extending in the sucking direction, is created, increasing the speed of the circulating stream (rotating air stream) to the point when the centripetal force and centrifugal force for the negative pressure core balance with each other, and a spiral flow is created which will artificially produce the tornado.

The fluid characteristics of the artificial tornado generated by the present invention are as follows:

(a) The vacuum core has a directivity such that its flow velocity toward the suction port will not vary even if the core is displaced along its length from the suction port.

(b) The circulating air stream converges toward the center in the form of a vortex, and the flow velocity is accelerated.

(c) The vacuum core is formed along the center of the circulating stream and uniformly extends toward the exhaust chimney.

(d) The centrifugal force and centripetal force are in balance with each other, and a tornado free, from variation between low speed range and high speed range, is formed.

The resultant fluid or aerodynamic characteristics of the present invention are such that the invention can be applied and utilized in an extensive range of applications calling for the generation of vertical, horizontal or oblique artificial tornados having a suction directivity in ambient air or free space within a pipe or by generating an artificial water tornado having a suction directivity within water.

The present invention can be utilized to collect and discharge detrimental gases and dusts which, at present, are collected and discharged through an exhaust hood. However, in a hood there is no suction directivity, and thus, the required controlled wind velocity has to be separately obtained. For that purpose, large volumes of air must be sucked so that the apparatus has had to be large at consequently enormous cost. According to the present invention, suction directivity can be obtained in ambient space by the artificial tornado so that detrimental gases and dusts can be collected and discharged concentrically from their generating source. The volume of wind for the discharging treatment may be less than half as large as in the conventional exhaust hood, and therefore the equipment cost is greatly reduced.

The second use for the present invention is for local cooling or warming (air conditioning), which currently is effected as for example in factories by blowing a cold wind or a warm wind directly onto workers. However, since the blown cold wind or warm wind is diffused within the factory, high energy input must always be provided. According to the present invention, by simply generating a low speed artificial tornado, a cold wind or warm wind may be constantly circulated in the free space, and therefore the energy cost is very low. Also, polluted air can be simultaneously purified.

A third use for the present invention is for decorative purposes. A natural tornado is a very interesting phenomena. For example, if a thick tornado, thin tornado, rocking tornado, rising tornado, or falling tornado is varied by an electric stimulus and the color of the tornado is varied by a colored illumination, a highly decorative effect, which has not so far been seen, will be provided.

A fourth use for the present invention is as an air shower used currently to remove dusts or the like from the air. As this is only to spray air, the dust is not cleanly removed. By utilizing an air shower in the form of an enclosed capsule, dust and germs can be positively and completely removed.

A fifth use for the present invention is that it can be utilized to increase the thrust of a ship. Currently, in order to increase the thrust of a hull, the shape of the screw is improved or a water wheel is set behind the screw to strengthen the water flow pushed out in the rear by the screw or to concentrate the water flow just after the screw in the advancing direction. According to the present invention, since directivity can be obtained by the artificial tornado in water, the suction force of the screw can be utilized also to increase the thrust of the hull.

A sixth use is to agitate a fluid. In order to agitate such fluids as food, a screw is currently fitted to the tip of a shaft and placed into the fluid. It is thus quite a problem to put the fluid into or remove the fluid from a vessel or to convey the fluid that a complicated mechanism has been required. According to the present invention, air, in open space, may be utilized to agitate the fluid, it can be simply and easily agitated without any trouble at all.

A seventh use is to transmit a rotating power which, at present, is transmitted mechanically generally by gears or pulleys. The clutch of the automobile seals a liquid and is therefore also mechanical. According to the present invention, as the rotating power can be transmitted by air in open space, there is not only a workable rotary power source, but it also has the advantage of being no trouble to the accompanying equipment.

An eighth use is to convey sales slips and paper documents as in pneumatic conveyor systems. In the known methods, the friction between the inside wall of conveying tube and the capsule holding the paper is so large as to require a propellant power. Also the trouble of putting the slips into or out of the capsule cannot be avoided and empty capsules must be conveyed through the system. According to the present invention, if the paper is put as it is into a conveying tube, it will be rolled through spiral-like air and therefore will be neither wrinkled nor broken and the difficulty in handling it will be greatly reduced. As the spiral current constantly rotates along the inside wall of the conveying tube, the slip can be conveyed as it is with only a small propellant power.

A ninth use for the present invention is to convey powder particles. In conveying powder particles a strong pump is conventionally used to convey the powder through a conveying tube. Therefore, sealing is required within the conveying tube, and it has been necessary to alternately convey a block of powder particles and air. According to the present invention, an artificial tornado is formed within the conveying tube, and powder particles are continuously conveyed on the tornado at a high speed. Further, a spiral air current is always rotating between the powder particles and the inside wall of the conveying tube, so that friction is reduced and the powder particles can be conveyed with a small power.

BRIEF DESCRIPTION OF THE DRAWINGS

In the drawings:

FIG. 2 being a method for collecting and discharging detrimental gases and dusts, FIG. 3 being a method for local cooling and warming, FIG. 4 being a method for a decoration, FIG. 5 being a method for an air cleaning shower capsule, FIG. 6 being a method for increasing the thrust of a ship, FIG. 7 being a method for agitating a fluid, FIG. 8 being a method to transmit a rotating power.

FIG. 9 being a method to convey paper, and

FIG. 10 being a method to convey powder particles.

DETAILED DESCRIPTION OF THE INVENTION

The formation and operation of the present invention shall be explained in the following description, taken together with the illustrated embodiments.

Figures 1A, 1B:
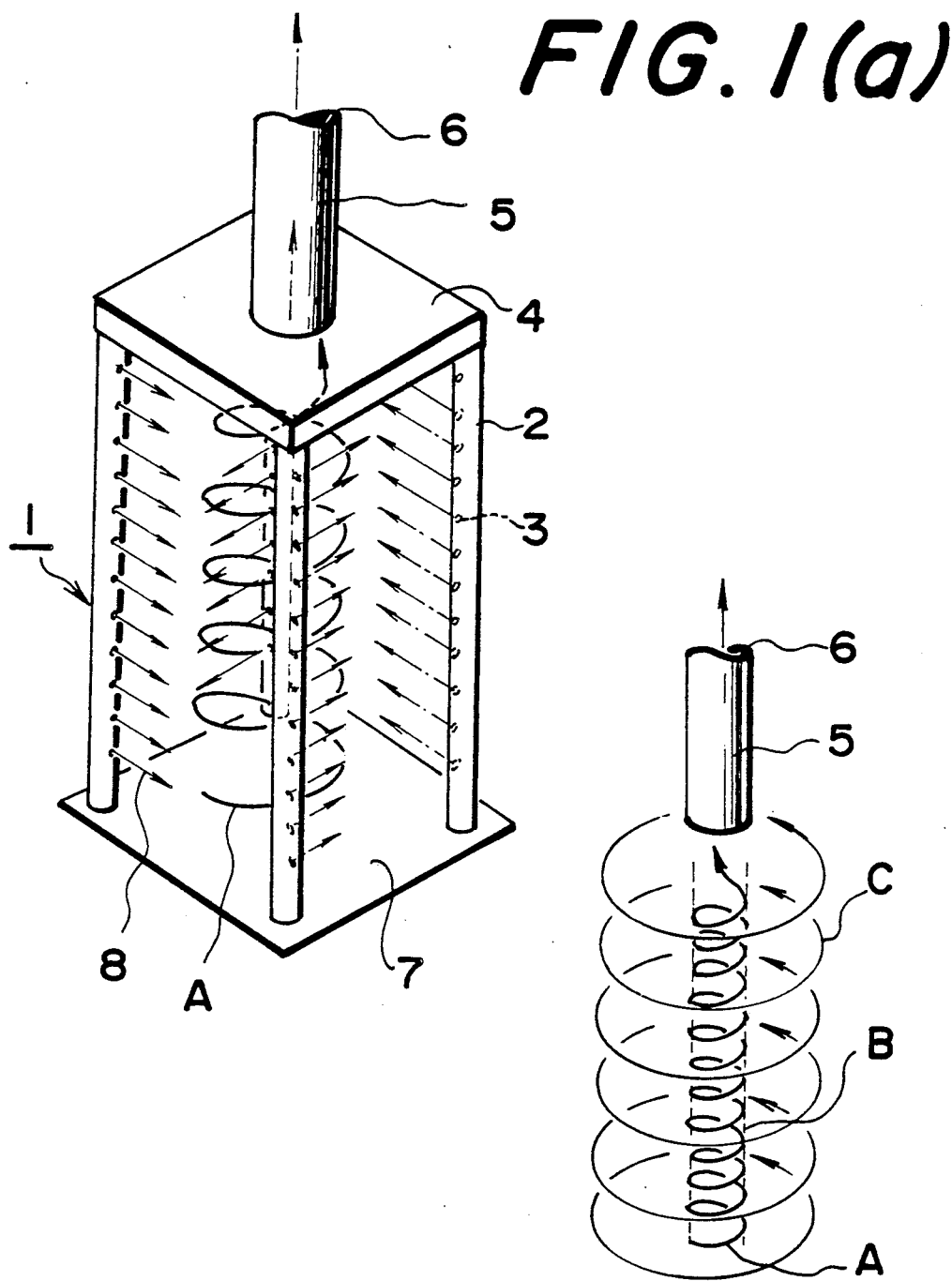
FIG. 1(a) is a schematic view showing an artificial tornado generating mechanism embodying the present invention.
FIG. 1(b) is a schematic view of the directional flow of the tornado.
Figure 1C:
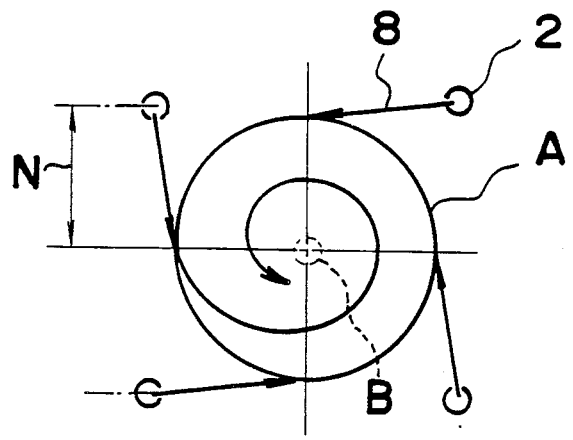
FIG. 1(c) is a vector diagram of the air flow in a cross section of the mechasnism shown in FIG. 1(a)
Figure 1D:
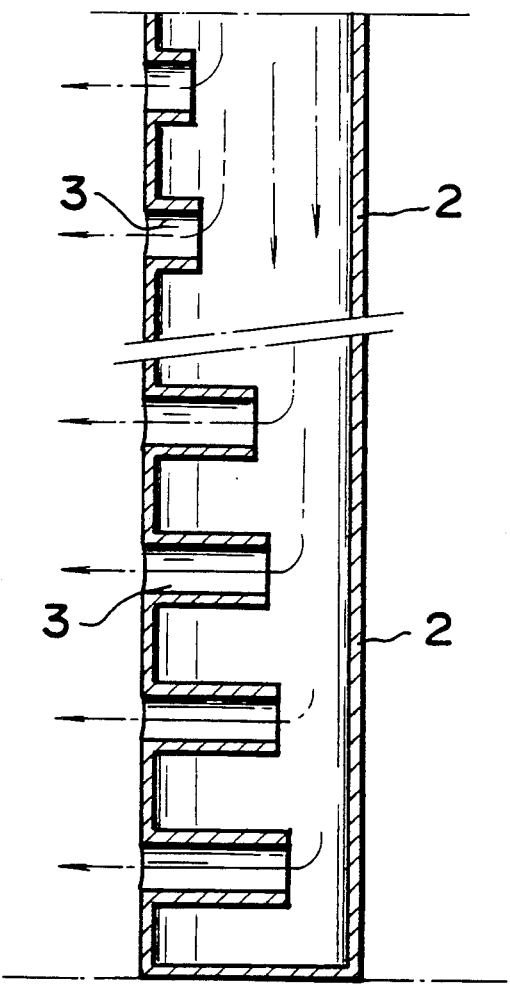
FIG. 1(d) is a sectional view through a corner air duct shown in FIG. 1(a)

As seen in FIG. 1(a), the artificial tornado generating mechanism, generally depicted by the numeral 1, consists of four air blowing pipes 2 arrayed uniformly about a central axis. As shown in FIG. 1(d), each air blowing pipe 2 has several air blowing ports 3 vertically spaced at regular intervals. The ports 3 are formed of varying length nipples extending into the pipe 2 so as to vary the velocity of the air exhausting therefrom. Preferably, as seen in FIG. 1(d), the nipples are arranged to be successively longer from top to bottom in the vertical direction. Also, as shown in FIG. 1(a), the respective air blowing pipes 2 support an air suction shielding member 4 at one end and stands on a base 7 at the other end. The pipes 2 are arranged relative to each other so that the ports 3 of each are commonly directed toward the pipe adjacent 2 situated in the right hand direction as seen in the drawing. An air suction outlet pipe 5 forming a chimney 6 is secured at the center of the shielding member 4, enabling the air to be exhausted.

The principle by which the artificial tornado generating mechanism operates is detailed in the following:

When air is fed into the respective pipes 2 by means of an air blower or the like, air will be blown out of the respective ports 3. In such case, air will be blown out successively so as to be always constant in the direction of each pipe 2 and to be in the same rotating direction. As a result, air curtains 8 are formed from the horizontal streams or jets 8a as indicated by the arrows. The jets 8a enclose the space bounded by the pipes 2 with the air curtains 8. As seen in FIG. 1(b), the action of the horizontal jets 8a, forming the air curtains 8, creates a rotary air circulating stream C within the periphery formed between the respective air blowing pipes 2. The circular stream C, in combination with the exhaust suction through chimney 6, forms a core B about the central axis of the rotary circulating stream. That is to say, as shown in FIG. 1(c), when the circulating stream C is formed within the air curtains 8, a centrifugal force will be given to the molecules of air by this circulating stream. On the other hand, a negative pressure will be produced along the central axis of the circulating stream by the exhaust suction. However, due to the centrifugal force, the negative pressure range will not extend outwardly to the periphery but will be concentrated in the core B along the center of the circulating stream and will extend uniformly longitudinally along the axis. This vacuum core B will input centripetal force to the molecules of circulating air. Where the centrifugal force and centripetal force balance with each other, the circulating stream will adopt a spiral flow, and an artificial tornado will be generated toward the exhaust chimney 6 through exhaust pipe 5.

The fluid characteristics of the thus generated artifical tornado are:

(1) that the flow velocity toward the exhaust chimney 6 is not different even when the core is displaced from the chimney 6, (2) that, so long as the centrifugal force of the spiral current and the centripetal force created by the negative pressure in the vacuum core balance with each other, there will be generated an artificial tornado which is stable from a very low speed range (of about 0.5 m/sec.) to a high speed range (above 20 m/sec.), (3) that, as the artificial tornado is generated along the center of the spiral flow, variation of the shape of the connected spiral generating mechanism, i.e., the ports 3 along the length of the pipes 2, artificial tornados in a variety of shapes such as a vertical tornado, a horizontal tornado, an oblique tornado, or a curved tornado can be formed, (4) that the velocity of the spiral flow converging in the center is quickly accelerated, and (5) that the rotating potential of the center vacuum core of the artificial tornado will remain strong even if displaced from the exhaust chimney 6.

The apparatus, illustrated for example in FIG. 1(a), may be made to provide a variety of tornados by selecting the relative amount or volume of air and the speed of the air flowing through pipe ports 3. Taking, for example, the diameter of the air supply pipe ports 3 as shown in FIG. 1(d) as 44 mm, and the distance between the ports as 96 mm, stable tornados may be formed by selecting the amount and speed of the air according to the following.

In general, as seen from FIG. 1(a) and FIG. 1(c), the surrounding air curtain 8 is produced by the individual jets 8a of air flowing from each of the ports 3 in the rectangularly arranged ports 2. Initially, the vectored jets 8a reduce in velocity as the air flows one half the distance N from the port 3 toward the opposite port 2. At the midway point L the air then accelerates, being captured in the circulating stream C of the vortex A.

Thus, the air acceleration can be calculated by the formula $$Vl = 0.24 \frac{Vo}{l} \quad \text{I}$$

where Vl represents the air velocity (in m/sec.) at the point M, and Vo represents the velocity (in m/sec.) of the initial jet at the port 3.

At the point l, the working air curtain 8 moves from the outside inward toward the vortex A, increasing the amount of air driven inwardly. This can be calculated by the formula $$\text{If } l \leq 1.2 \text{ m}, Ql = 1.2 \cdot l \cdot Qo \quad \text{II}$$

$$\text{If } l \geq 1.2 \text{ m}, Ql = 1.36 \cdot l/3 \cdot Q$$

where Ql represents the outer air volume at the point l, and Qo represents the blown air volume originating at the port 3.

The relationship of the air volume in the stable tornado and the blown-in air shown as;

$$Qe = 4Qo + 4Ql + Qg$$

wherein Qg represents the amount of the detrimental gases in the tornado.

This formula calculates the velocity attenuation of the wind blown out of the air curtain in the free space. When $l = \frac{1}{2}$ m. and Vl is predetermined, and Vl is determined by this formula, the wind volume Qo will be determined by multiplying Vo with the blowing area and therefore the initial blowing volume will be able to be selected.

Further, the result of the experiment is also defined by the following items:

(1) When the spiral flow velocity and vacuum wind volume were balanced with each other, there was obtained an artificial tornado which was stable from a low speed range of about 0.5 m/sec. to a high speed range above 20 m/sec.

(2) The spiral flow positively converged in the central core part and was accelerated from 5 m/sec. in the peripheral part to 10 m/sec.

(3) The wind velocity toward the chimney in the center did not vary even if the tornado was displaced from the chimney and a flow direction was given to the vacuum core B.

(4) The twisting potential (rotation energy) in the central core part remained strong even if displaced from the chimney.

(5) By varying the shape of the pipes 2, the generated tornado could be freely varied along its length in the vertical, horizontal or curved directions.

FIGS. 2 to 10 show embodiments utilizing the artificial tornados generated by the mechanism of the present invention.

Figure 2:
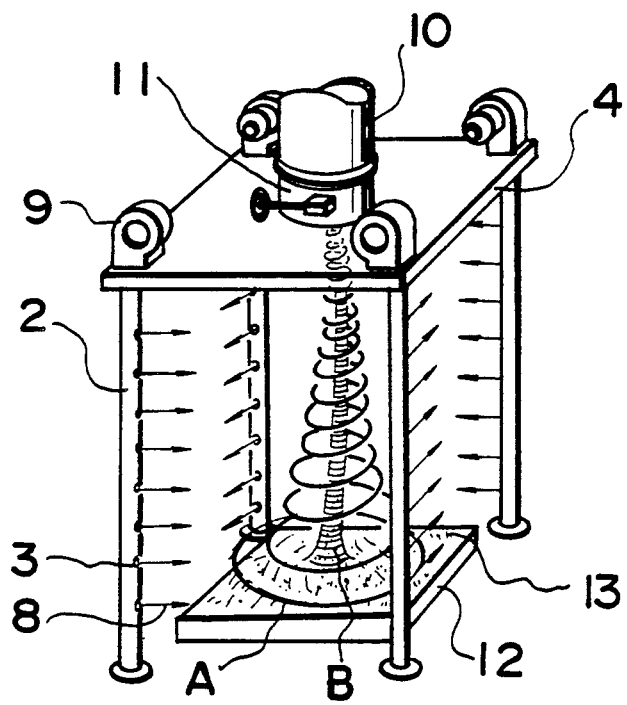
FIGS. 2 to 10 are each schematic views showing uses of the mechanism of the present invention.

FIG. 2 shows an embodiment for collecting and discharging harmful gases and dust. A suction duct 10 provided with a damper 11 is mounted on the hood 4, and each of the four air blowing pipes 2 are fitted with individual blowers 9. A vessel 12 containing dust 13 is located so that when the device is set over the vessel 12, the jets 8a blown from the blowers 9 form air curtains 8 moving from left to right as indicated by the arrows in the figure. Through formation of the air curtains 8 and the creation of the vacuum through the chimney 10 forming a core B, an artificial tornado A is created, sucking up the dust 13 from the vessel 12 and discharging it out through the chimney 10. The same effect will be obtained by the same method for waste gases.

By utilizing the characteristics that the flow velocity of the artificial tornado A toward the chimney will not vary even if displaced along its length from the axis of the chimney and that the spiral flow will converge toward the center so as to be accelerated, the detrimental gases and dust are enclosed within the peripheral air curtains 8. In this manner the generated waste gases and dust may be strongly collected within the periphery of the apparatus and discharged within the artificial tornado.

Figure 3:
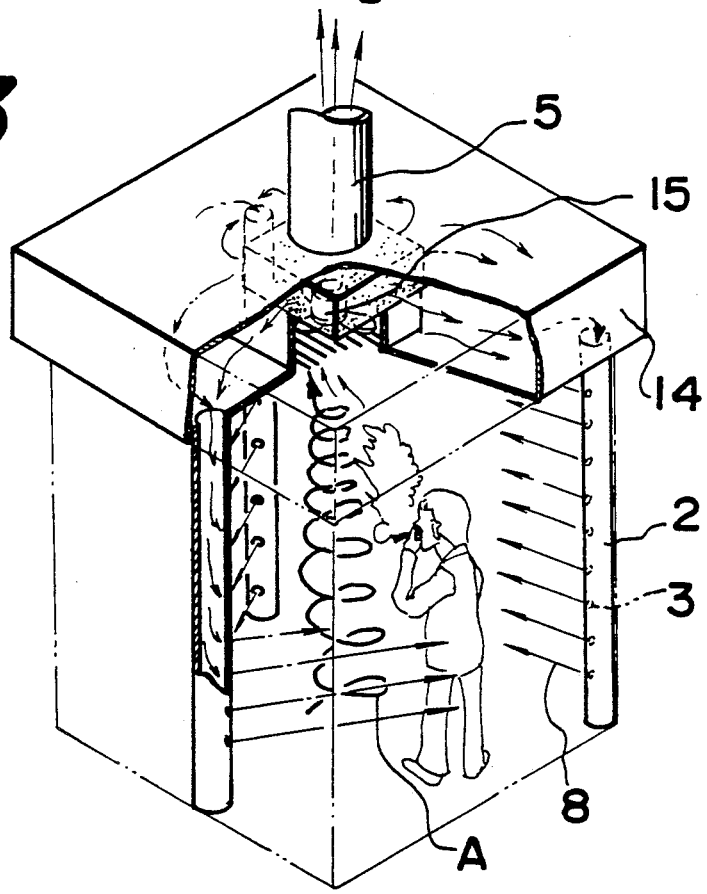

FIG. 3 is of an embodiment utilizing the invention to provide local cooling and warming (i.e., air conditioning). Here the shielding member 4 is formed with a depending rectangular hollow hood 14, forming a manifold chamber through which air may be fed into the pipes 2 from a source not shown. Mounted in the center of the shielding member 4 and isolated from the hood 14 is an exhaust fan 15 opening into the free space between the pipes 2 and having as its outlet the chimney 5. The air blowing pipes 2 are three in number and are triangularly arranged about the central axis of the air feeding hood 14. This device is set in a desired place, and cold air or warm air is fed into the air feeding hood 14 from the source so that a triangular air capsule may be formed by the triangularly produced air curtains 8 to cool or warm the interior of the air capsule. Also, at the same time, the air within the triangular air capsule can be purified. A square or polygonal air capsule having the same effect will be obtained by increasing the number and arrangement of the poles 2.

By utilizing the characteric that a stable artificial tornado will be generated even in a low speed range and that the spiral flow will converge in the center and will be directed to the chimney, a heater or cooler arranged in association with the hood 14 will enable warm air or cold air to be sucked toward the center and repeatedly circulated to efficiently warm or cool the space enclosed within the air curtains.

Figure 4:
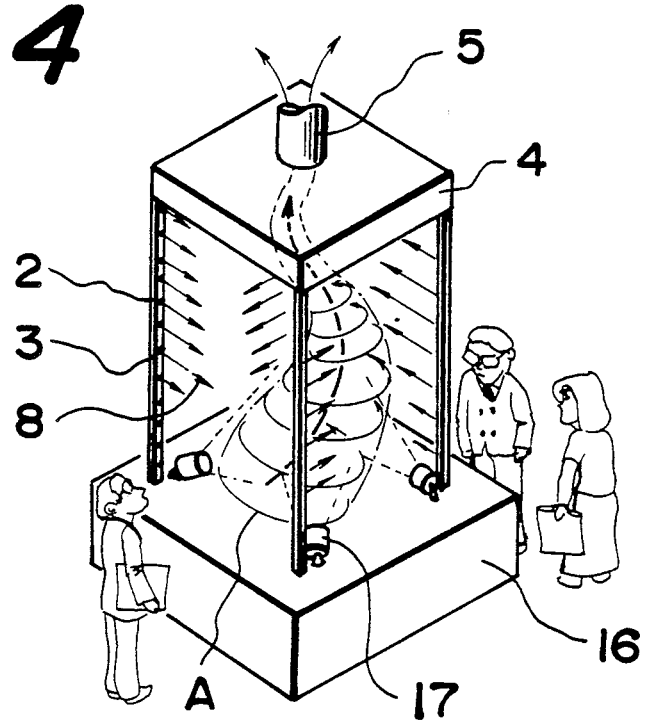

FIG. 4 is of an embodiment utilizing the invention for a decoration. The basic mechanism of the present invention shown in FIG. 1(a) may be utilized for decorative purposes in a department store or the like. The device may be set on a stand 16 and snake-line or undulating artificial tornado generated and illuminated by lights 17 in a colorful and decorative manner. The artificial tornado A can be freely transformed by varying the strength of the spiral flow by variation of the air volume through ports 3 and the volume of sucked air from the exhaust.

By utilizing the characteristic that the wind velocity moving toward the chimney 5 will not vary even if displaced along the length from the suction port of the chimney and that a vertical, horizontal, oblique or curved tornado can be freely formed, a free artificial tornado may be made visible by introducing smoke to the center of the tornado from a smoke generating source. In this way, the colorfully illuminated tornado becomes easily observed as a decoration.

Figure 5:
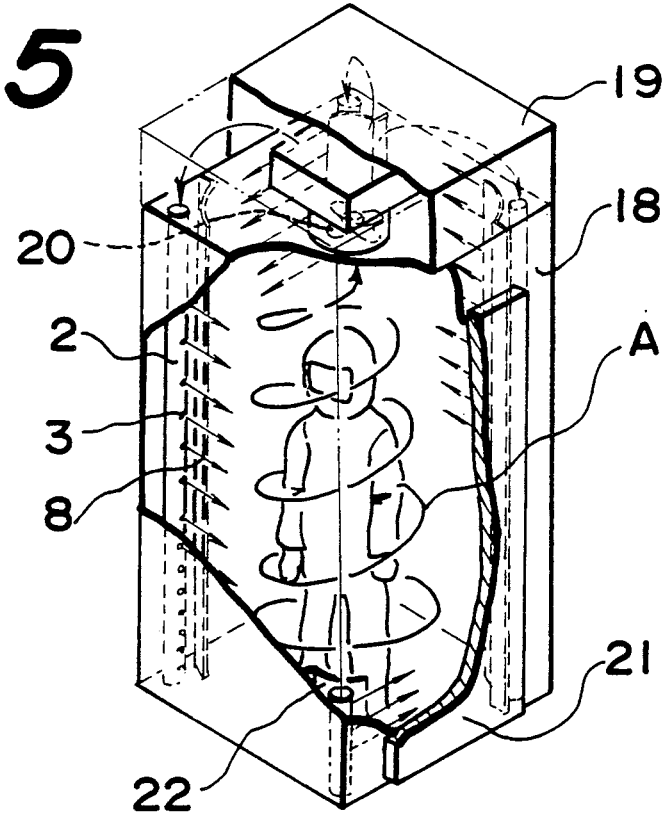

In FIG. 5 the invention is embodied in an air shower capsule. The peripheral air curtain 8 is created as in FIG. 3 by the blowing pipes 2 fed here with air through a roof duct 19 provided with a central circulating exhaust fan 20. The peripheral curtain 8 is surrounded in a box-like housing 18 provided with a door 21 into which a person can walk. The air blowing pipes 2 are provided with an air filter 22 in each corner. This device operates by the same principle as of the mechanism shown in FIG. 1 wherein an artificial tornado A is generated within a capsule 18 about its central axis.

In this device an artificial tornado can be generated around a human body within the air shower capsule so as to remove dust and germs deposited on the working uniform of the person.

Figure 6:
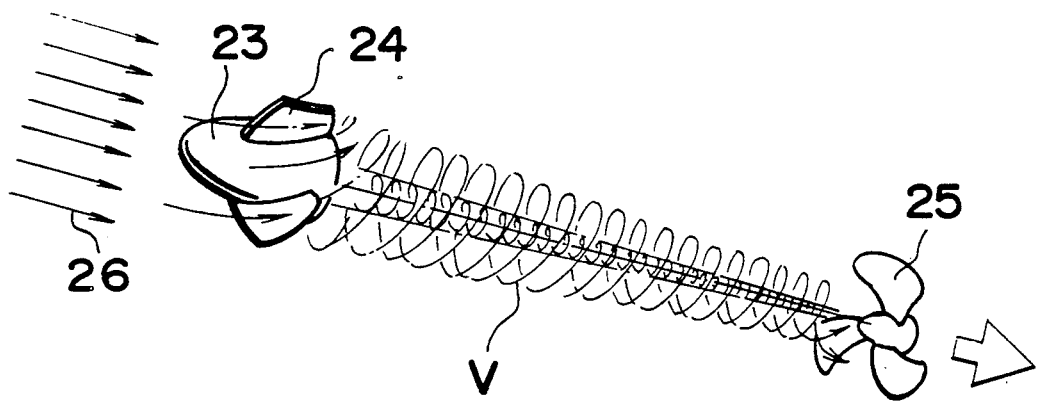

FIG. 6 illustrates an embodiment of the invention to increase the thrust of a ship's hull. A water spiral flow screw 23 provided with blades 24 fitted to a propeller 25 so that an artificial water tornado V may be formed between the propeller 25 and water spiral flow screw 23 as the hull moves through the water flowing in the direction indicated by the arrows 26.

By utilizing the characteristic that the flow velocity toward the chimney of the artificial tornado will not vary even if displaced axially from the suction port, the constant water flow by the advance of the ship is converted to a rotary flow by the blades to generate a water tornado between the blades and screw so as to increase the thrust in addition to the thrust created by the conventional screw.

Figure 7:
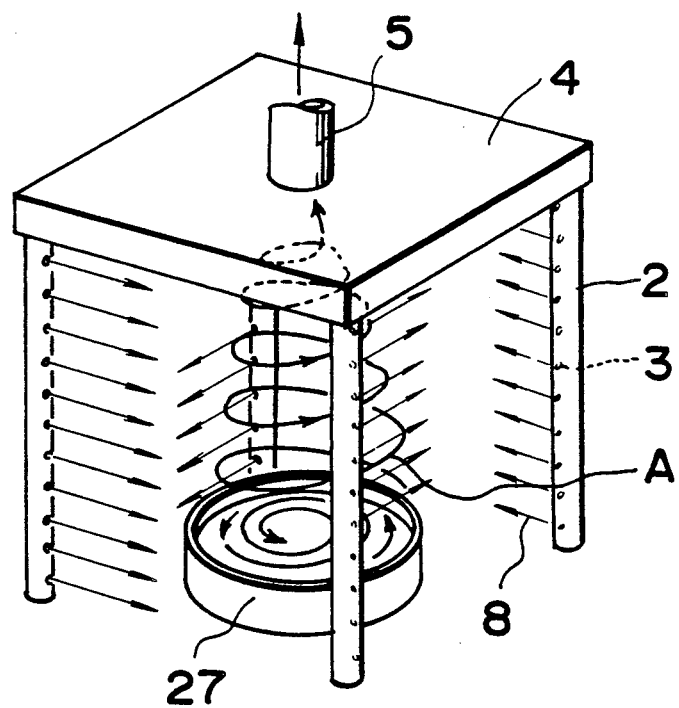

FIG. 7 is a view of an embodiment in which the invention is used to agitate a fluid. The mechanism of the present invention shown in FIG. 1(a) is set upon a vessel 27 containing a fluid so that, when the artificial tornado is generated, the fluid within the vessel will be set in motion and rotate.

Even if the center of the artificial tornado moves out of alignment with the suction port, the rotating potential will remain strong. The vessel containing the fluid is preferably placed on the floor surface at the center of the tornado so that the fluid in the vessel may be strongly agitated by air while open in the free space.

Figure 8:
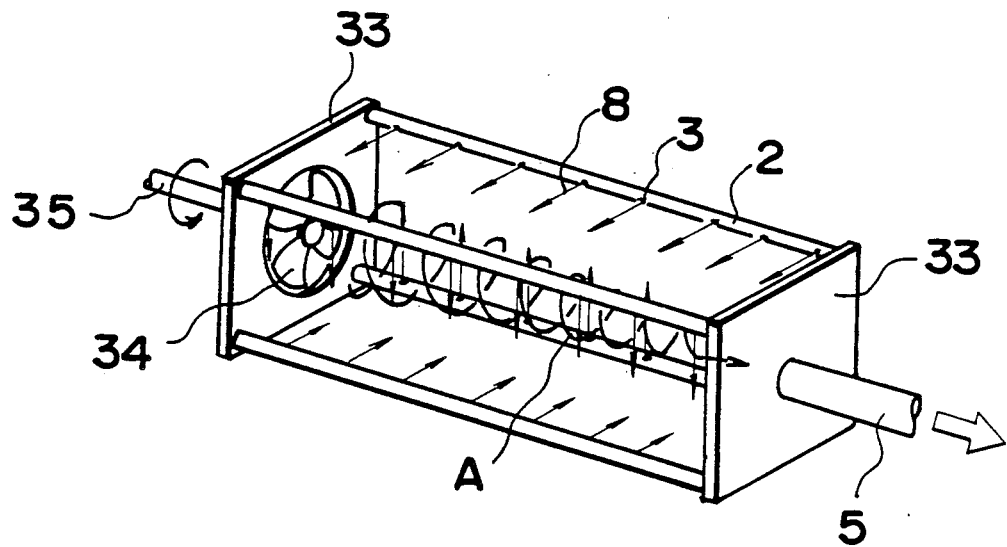

FIG. 8 illustrates the invention as a device to transmit a rotating power to a mechanical rotor or the like. The basic mechanism of the present invention shown in FIG. 1(a) is arranged in a horizontal axis having four air blowing pipes 2 located between a shielding plate 33 provided with an air exhaust pipe 5 and a base shielding plate 33. A rotor 34 operatively connected with a rotary drive shaft 35 is mounted in the base shielding plate 33.

By utilizing the characteristic that the rotating potential of the artificial tornado will remain strong even if displaced from the exhaust port, the coaxial rotor can be effectively induced to rotate.

Figure 9:
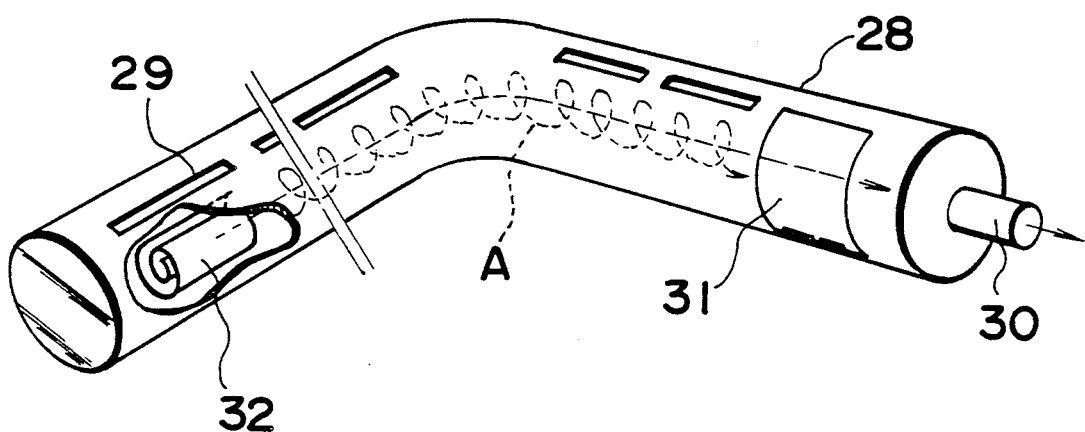

FIG. 9 utilizes the invention as a pneumatic transport to convey paper slips and the like. Here a conveying pipe 28 shielded at one end and fitted with a suction pipe 30 at the other end has air feeding ports 29 formed on the surface. Air is fed from a source tangentially into the ports 29 to converge toward the center axis of the pipe 30 a tornado A helically moving to the exhaust port 30 is created. Thus when a slip 32 is inserted into its conveying pipe 28, it will be able to be conveyed through and removed from the outlet 31.

Since the spiral flow converges toward the center of the conveyor pipe, the artificial tornado is formed along the central axis. The elongated conveyor can be oriented in any direction so that a vertical, horizontal, oblique or even curved tornado can be freely formed. A sales slip or the like inserted through a groove-shaped incision of the circular sectioned pipe will ride the air current, will be rolled due to the helical path of the wind through the center of the pipe, and will be directed to the exhaust port without catching on the inside wall of the pipe.

Figure 10:
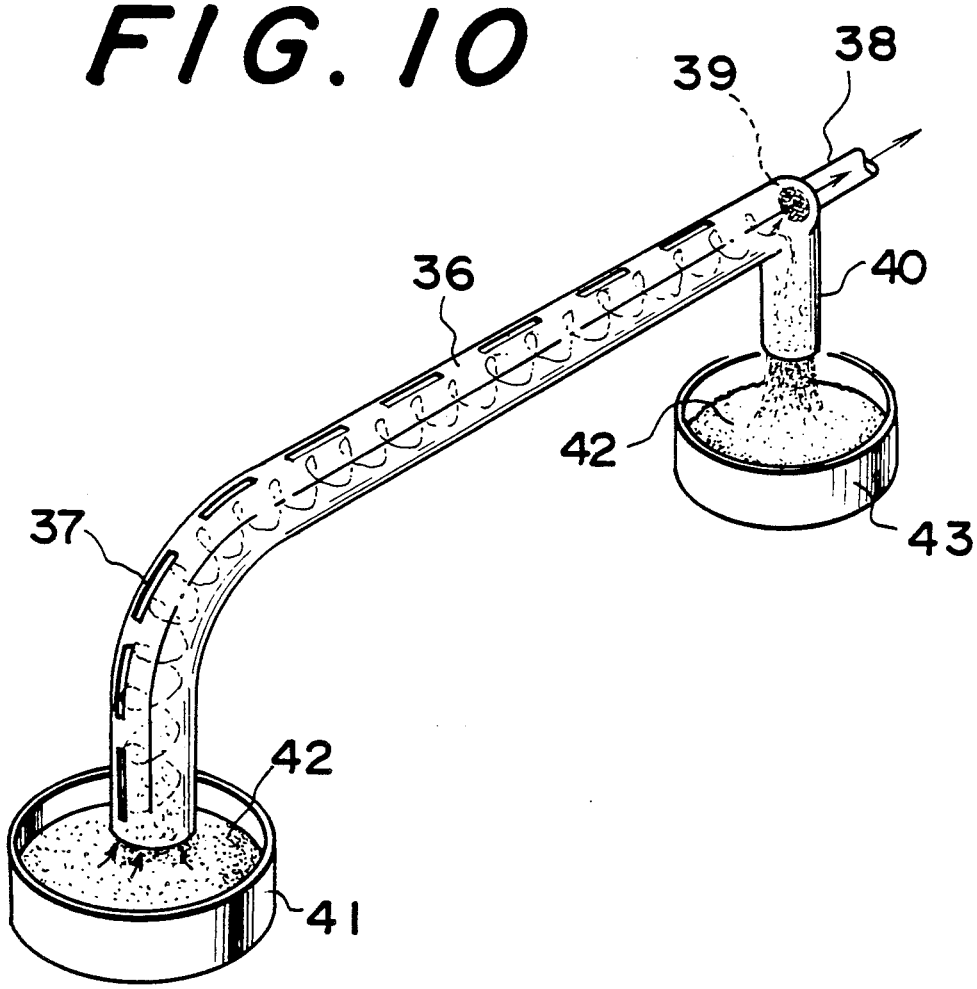

FIG. 10 illustrates an embodiment utilizing the invention to convey powder particles. Here a conveying pipe 36 such as that shown in FIG. 9 having an open inlet at one end and provided with air feeding ports 37 and an air exhaust pipe 38 covered with a filter 39 at the opposite end. An outlet 40 is arranged at the other at a right angle to the exhaust. When this conveying pipe 36 is placed with its inlet end into a vessel 41 containing powder particles 42 and is set at the other end in a vessel 43, and an artificial tornado is generated within the conveying pipe 36, the powder particles 42 will be conveyed to the vessel 43 through the conveying pipe 36.

Even if the artificial tornado is displaced from the exhaust, the flow velocity toward the exhaust port will not vary so that the spiral flow is accelerated as it converges toward the center axis and whether a vertical, horizontal, oblique or curved tornado is formed the artificial tornado may have a high speed range. Thus, the powder particles may be sucked in from one end of the pipe and continuously conveyed at a high speed with a reduced friction even if the pipe is bent.

What is claimed is:

1. The method of generating an artificial tornado comprising the steps of creating a continuous fluid curtain uniformly spaced from and circulating about a central axis, withdrawing fluid from one end of said axis to form a vacuum core along said axis, and simultaneous creating a spiral flow of fluid within the space between said fluid curtain and about said central axis, said fluid curtain, spiral fluid flow and withdrawal or fluid cooperating to accelerate the fluid flow within said array to produce a tornado.

2. The method according to claim 1 including the step of varying the flow of fluid in at least one of said continuous fluid curtain, spiral fluid flow and withdrawal of fluid to vary the characteristic of said tornado.

3. The method of generating an artificial tornado comprising the steps of arranging a plurality of pipes, each provided with ports spaced along its length in an array about a central axis so that said ports are directed in a common direction toward the next adjacent pipe, shielding said array at at least one end of said pipes by a cover plate having an exhaust opening aligned with the central axis, blowing fluid through said pipes to form an air fluid curtain continuously about the periphery of said array, creating an air flow along the central axis toward said exhaust opening, and creating a rotary air flow within said array about said central axis and simultaneously removing fluid from said exhaust opening to accelerate the fluid into a tornado within said array.

4. The method according to claim 3 including the steps of providing the artificial tornado generating mechanism with a suction duct fitted in the central part of the cover plate and each of the respective pipes with a blower and mounting the end opposite the cover plate in communication with a source generating detrimental gases and dust so that the artificial tornado will collect and discharge the detrimental gases and dust through said opening.

5. Apparatus for generating an artificial tornado comprising a plurality of hollow pipes, each pipe having a plurality of ports along their length, said pipes being arranged parallel to each other in a spaced array about a central vertical axis, said array having at least one end shielded by a cover plate having a discharge opening aligned with the central axis, said pipes being arranged so that the ports are pointed parallel with respect to each other and toward the next adjacent pipe in a common direction horizontal to the central axis; means for blowing fluid through each of said pipes to form a continuous circulating fluid curtain in the horizontal direction about the central axis, said fluid curtain separating the air space within said fluid curtain from the air space outside said fluid curtain; means for blowing fluid along said central axis to create an axial fluid flow within the fluid curtain, said axial flow cooperating with said horizontally circulating fluid to create a centrifugal fluid stream between said fluid curtain, and means for selectively regulating the relative strength of said circulating fluid and said axial fluid flow to cause said centrifugal fluid stream to flow spirally about the central axis and exhaust through said discharge opening in said cover plate.

6. The apparatus according to claim 5 wherein said means for creating the rotary stream within the array comprises means for exhausting said axial fluid flow under suction through said discharge opening.

7. The apparatus according to claim 5 wherein said means for creating the rotary fluid stream comprises means for varying the pressure of fluid blown through selected ones of said ports.

8. The apparatus according to claim 7 wherein said ports each comprise a nipple extending within said pipe, said nipple progressing in size along the length of said pipe to effect variation of the fluid through said ports.

9. The apparatus according to claim 7 wherein said means for blowing fluid through said pipes includes a blower for creating a fluid stream under pressure.

10. The apparatus according to claim 9 wherein each of said pipes is provided with a pump for blowing said fluid.

11. The apparatus according to claim 9 wherein said cover plate comprises a hollow member defining a manifold chamber, and each of said pipes are connected thereto in communication with said manifold chamber, said manifold chamber being provided with a pump for blowing air simultaneously to said pipes.

12. The apparatus according to claim 5 including housing means surrounding and enclosing said continuous fluid curtain.

13. The apparatus according to claim 5 wherein said opening in said cover plate includes fan means to exhaust the fluid from within said array.

14. The apparatus according to claim 5 wherein said opening in said cover plate is provided with a chimney duct.

15. The apparatus according to claim 14 wherein said chimney duct is provided with means for regulating the flow of fluid therethrough.

16. The apparatus according to claim 5 including means for mounting the plurality of pipes so that the end opposite the cover plate is in communication with a source of fluid like material to be moved whereby the rotary fluid stream may move said fluid-like material.

* * * * *